3,247,103
REMOVAL OF ALKYL BENZENE SULFONATES FROM WATER
Jer-Yu Shang, Wilmington, Del., assignor to Sun Oil Company, Philadelphia, Pa., a corporation of New Jersey
Filed Dec. 3, 1962, Ser. No. 241,897
8 Claims. (Cl. 210—21)

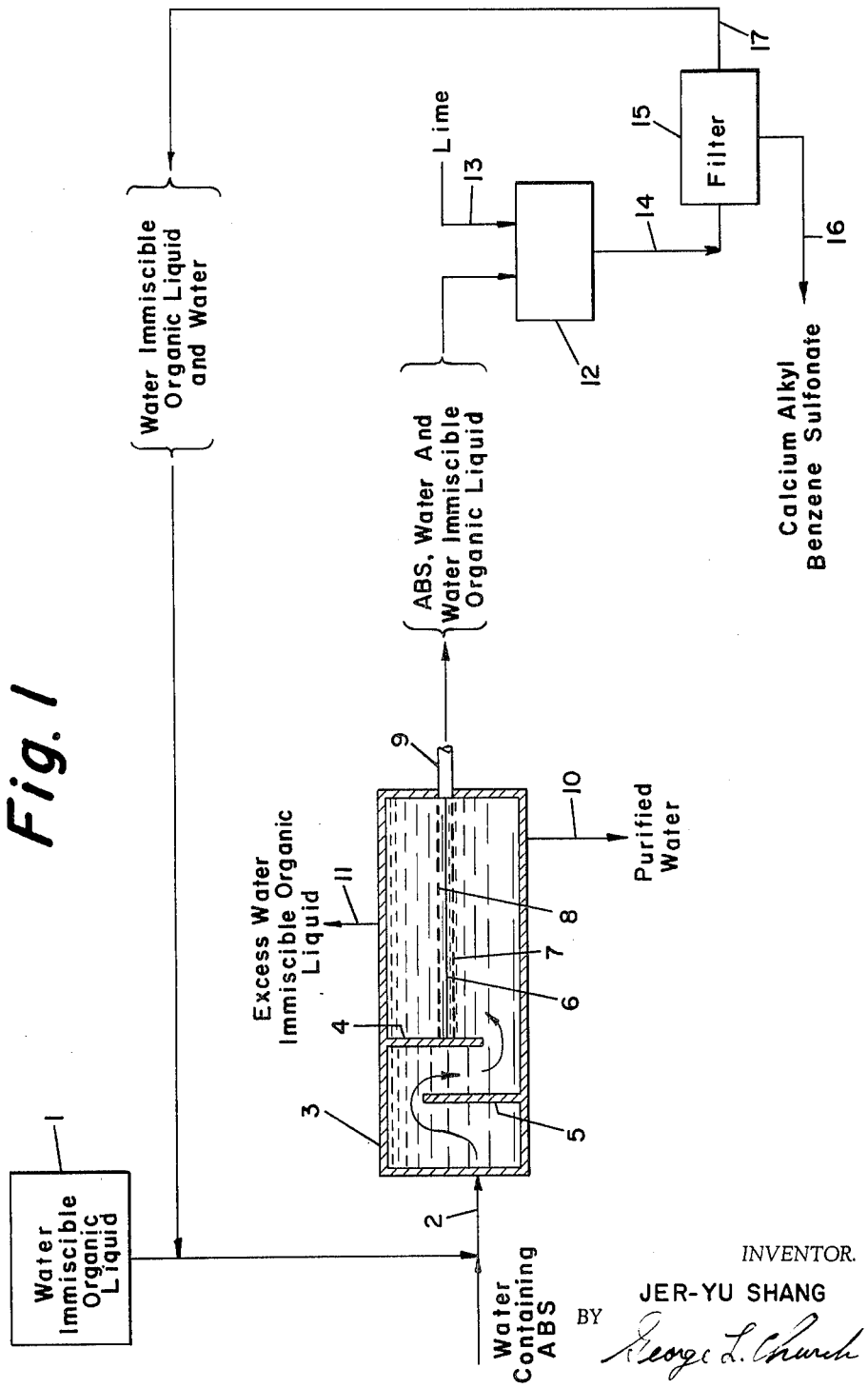

This invention relates to the removal of alkyl benzene sulfonates from water and is particularly applicable to the removal of such sulfonates from sewage water. The invention thus provides a method by which the tendency of sewage water to foam due to the presence therein of alkyl benzene sulfonates can be reduced or eliminated.

The increased use of alkyl benzene sulfonates as household detergents in recent years has caused serious sewage water foaming problems, particularly in municipal sewage water treating facilities. Sometimes an unsightly accumulation of foam is found at the point where purified effluent from a sewage water purification plant discharges to a lake, reservoir, river, etc. Such foaming also causes difficulties in the pumps and pipelines involved in supplying water to a community. Moreover, the foaming problem is not peculiar to municipal water systems. Many industrial plants obtain water for condensers, etc. from nearby rivers and lakes, and the tendency of the water to foam causes numerous difficulties. For example, pumps and condensers become airbound.

The detergents mainly responsible for the above described foaming problems are the alkyl benzene sulfonates, conventionally and hereinafter referred to as ABS. Such detergents typically have the following structure:

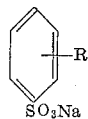

wherein R is a hydrocarbon radical containing 10–22 carbon atoms at least 10 of which are in a straight chain. While detergents other than ABS are also in commercial use at the present time, they cause substantially no foaming problems because they are biodegradable, i.e., they are converted to non-foaming compounds by the bacteria normally present in sewage water. Unfortunately, this is not the case with ABS detergents, hence a method for removing them from sewage water is highly desirable.

According to the invention ABS detergent is separated from water containing same by a process which comprises mildly contacting the water with a water immiscible organic liquid and settling the resulting mixture so as to form a lower layer of water and an upper layer of water immiscible organic liquid. Upon such contacting and settling, the ABS is concentrated, i.e., collected, adjacent to the interface between the two immiscible liquids. The organic liquid and the ABS concentrated adjacent to the interface are then separated from the water phase in any convenient manner, whereby water of reduced ABS content is obtained.

The reason for the collection or concentration of the ABS at the interface between the water and the organic liquid is the unique chemical structure of detergents generally and ABS in particular. The $SO_3Na$ portion of the ABS molecule is hydrophilic, i.e., it is attracted to water, and organophobic, i.e., it repels organic liquids. On the other hand, the remainder of the ABS molecule, i.e., the benzene ring with hydrocarbon radical attached thereto, is organophilic and hydrophobic, i.e., it is attracted to organic liquids and repelled by water. Consequently, in the presence of water and a water-immiscible organic liquid, any ABS molecules present at the water-organic liquid interface tend to be retained there, the organophilic portion of each molecule being in the organic liquid phase, the hydrophilic portion being in the water phase.

The purpose of the initial mild contacting, i.e., mild mixing, of the organic liquid and water is to bring all the ABS molecules, already in contact with water, into contact with the organic liquid. Such mixing results in the formation of a very large interfacial area between the water and organic liquid and hence causes most if not all of the ABS molecules to be present at a water-organic liquid interface. When the mixing is subsequently stopped and the organic liquid is allowed to separate and form a separate layer above a water layer, the ABS molecules are in effect "dragged" out of the water phase to the interface between the two said layers.

The organic liquids suitable for the present purpose must be water immiscible, i.e., in the presence of water the organic liquid will form a separate, distinct phase. The mutual solubility of such organic liquids with water will generally be less than 1% by weight at the temperature at which the invention is practiced, i.e., the solubility of the organic liquid in water expressed as the organic liquid content of a saturated solution is less than 1% and the solubility of water in the organic liquid expressed as the water content of a saturated solution is less than 1%. While a large variety of organic liquids will form a separate and distinct phase with water and hence are suitable for the present purpose, some are more immiscible than others and hence are preferred because they result in less organic liquid dissolved in the water and less water dissolved in the organic liquid. The preferred organic liquids have a mutual solubility with water of less than 0.1% by weight at the temperature at which the invention is practiced. Examples of organic liquids which at 25° C. meet this lower solubility criteria are cyclohexane and isomers thereof, kerosine, naphtha, benzene, toluene, benzophenone, and benzylchloride. Some of these compounds, for example, toluene, naphtha, and kerosine, have a mutual solubility with water of essentially zero. Others such as benzene have a mutual solubility of approximately 0.05–0.1%. Apart from solubility factors, hydrocarbon organic liquids are preferred because they are usually less expensive and more readily available.

The above organic liquids are suitable for use at 25° C. as stated. All are suitable at lower temperatures and many are suitable at still higher temperatures. Since the solubility of most known organic liquids is readily available in the literature, the criteria for selection of a water-immiscible organic liquid is readily available to one skilled in the art.

As described, the water is first mildly contacted with the water immiscible organic liquid after which the liquids are allowed to separate into separate layers. The initial contacting is described as mild because while it is sufficient to intimately mix the water and organic liquid, it is insufficient to result in the formation of a stable emulsion. When mild contacting is employed the two liquids will separate into two distinct layers in 5–20 minutes, usually 1–2 minutes, when the agitation or other means of effecting the contacting is subsequently stopped. If the agitation is vigorous enough to form a stable emulsion, separation into two separate layers may not occur for hours or weeks. The initial mild contacting can be carried out in any convenient manner, examples of suitable methods being described hereinafter.

After the mild contacting is complete, the two immiscible liquids are allowed to separate into separate layers. The upper layer is organic liquid, the lower layer is water which is, except for a small amount of water adjacent the interface, reduced in ABS content and hence purified. ABS is concentrated adjacent the interface between the two liquids. There may also be a small amount of foam at the interface if the original water contained dissolved air or if the initial contacting was vigorous enough to inject air from the surrounding atmosphere into the liquids.

Purified water is separated from the organic liquid and the ABS concentrated at the interface in any convenient manner. If the invention is carried out in a conventional mixing tank, using, say, mechanical agitation to effect the mild contacting, it is usually most convenient to merely drain the purified water out of the bottom of the tank. In so doing care should be taken not to drain out any of the ABS concentrated adjacent the interface. A convenient means of avoiding this is to stop the draining when the interface is within 1–2 inches of the tank or vessel outlet. Rather than using mechanical agitation to effect the mild contacting, it is often convenient to spray the organic liquid in the form of droplets into the water near the bottom of the tank. The droplets of organic liquid float to the surface of the water carrying ABS molecules with them. A layer of organic liquid forms above the surface of the water with the ABS concentrated adjacent the interface. The purified water is drained out of the bottom of the tank, or alternatively, the organic liquid layer and the ABS are decanted from the purified water.

The invention is also readily adaptable to continuous operation and this is, in fact, the preferred mode of operation. An illustrative example of the continuous removal of ABS from water containing same is shown in FIGURE 1. Water containing ABS and a water immiscible organic liquid, the former obtained from a source not shown and the latter obtained from a source indicated at 1, are pumped through a common pipeline 2 into the side of a horizontal cylindrical tank 3 The size of pipeline 2 is such that the velocity of the two liquids in the pipeline is sufficient to cause their intimate mixing without forming a stable emulsion. The feed end of tank 3 is provided with baffles 4 and 5 so that once inside the tank the water and organic liquid rapidly reach a quiescent state. The two liquids rapidly separate into two layers separated by an interface, the latter being indicated by line 6. The concentration of ABS adjacent to the interface is indicated by the area between lines 7 and 8. The ABS concentrated at the interface is withdrawn from tank 3 through outlet pipe 9 which is positioned at the level of interface 6. In withdrawing the ABS some water and organic liquid will unavoidably also be withdrawn. Purified water is withdrawn through line 10 at the bottom of tank 3. The rate of water withdrawal through line 10 is adjusted so that the total amount of water removed through lines 9 and 10 equals the amount of water entering the tank through line 2. If the amount of organic liquid passing out of the tank through line 9 is less than that entering through line 2, the difference is made up by withdrawing additional organic liquid through line 11. By keeping the total withdrawal of water and organic liquid equal to the input of same, the interface remains at a constant level.

It will usually be desirable to treat the mixture of ABS, water, and organic liquid withdrawn through line 9 in order to recover the ABS and/or organic liquid. Such recovery is also illustrated in FIGURE 1. The mixture of ABS, water, and organic liquid withdrawn through line 9 is passed into tank 12. Lime, obtained from a source not shown, is added to the mixture through line 13. Sodium alkyl benzene sulfonate is converted to calcium alkyl benzene sulfonate which precipitates. The precipitate and the remaining water and organic liquid are removed from tank 12 through line 14 and passed into filter 15 which is any conventional filter for separating solids from liquids. The precipitate, calcium alkyl benzene sulfonate, is removed from the filter through line 16. The organic liquid and water are removed from the filter through line 17 and are recycled to treat additional quantities of water containing ABS.

Any organic liquid present in the purified water can be separated by, say, distillation. Where, however, the organic liquid employed is essentially completely insoluble in the water, such distillation will usually be considered unnecessary.

It is apparent from the foregoing description that the invention can be carried out in any convenient vessel. Preferably, however, the vessel is so shaped that the interfacial area between the water layer and the organic liquid layer is relatively large in order to insure that all the ABS can actually reach the interface. If the area is relatively small, some ABS may not be able to reach the interface and will be present in the water thereafter separated. In cases where the original ABS content of the water is quite high, it may be impractical to obtain sufficient interfacial area to effect removal of all the ABS in one treatment. In such a case complete removal of the ABS can be achieved by repeating the treating procedure one or more times.

Regardless of the equipment used to perform the invention, the collection or concentration of ABS at the interface between the water layer and the organic liquid layer can be accelerated by generating an electrostatic field across the interface. This technique depends upon the fact that ABS ionizes in water, to wit,

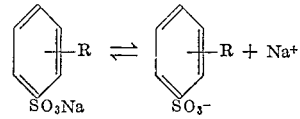

The negative electrode, preferably shaped as a plate, is placed in the organic liquid layer parallel to and close to the interface. The positive electrode is positioned similarly in the water layer. Application of a potential across the electrodes attracts the ions to the interface.

The amount of organic liquid used will vary depending upon such factors as the amount of water to be treated, the shape of the vessel to be used, and the like, but should be sufficient to form a distinct organic liquid layer.

The treating procedure is preferably carried out at room temperature (e.g. 20°–30° C.) but higher or lower temperatures can be used if desired. Higher temperatures are generally less desirable because they cause an increase in the mutual solubility of the organic liquid with water.

EXAMPLE 995 parts of water were mixed with 5 parts of ABS of the formula described hereinbefore. The "R" radical of the ABS was in the para position and was a mixture of $C_{10}$ to $C_{16}$ straight chain hydrocarbon radicals. A portion of this mixture was mixed with calcium chloride. A white precipitate, calcium alkyl benzene sulfonate, formed. Another portion of the mixture was charged to a 500 ml. separatory funnel until a layer approximately 4″ high was obtained. Next a quantity of kerosine was charged to the funnel and it formed a separate layer on top of the water. The kerosine layer was approximately 1″ high. Within 15 minutes a small amount of foam had formed at the interface. The air which caused the foam was most likely carried into the water by the pouring of the kerosine. The height of the foam was approximately ⅛″. Next approximately 3½″ of the water layer was drained from the bottom of the funnel leaving, as the final contents of the funnel, a layer of water about ½″ high, a layer of kerosine about 1″ high, and about ⅛″ of foam.

The foam, kerosine, and residual water remaining in the funnel were then mixed with aqueous calcium chloride. A white precipitate, calcium alkyl benzene sulfonate, formed and was removed by filtration. The separated water was also mixed with aqueous calcium

I claim:

1. Method of removing sodium alkyl benzene sulfonate detergent from water which comprises mildly and intimately contacting water containing sodium alkyl benzene sulfonate detergent with a water-immiscible organic liquid, settling the resulting mixture in a separation zone to form an upper organic liquid layer and a lower water layer, whereby sodium alkyl benzene sulfonate detergent collects adjacent the interface between the layers, and removing from the separation zone water essentially free of sodium alkyl benzene sulfonate detergent.

2. Method according to claim 1 wherein a mixture of organic liquid and sodium alkyl benzene sulfonate detergent which has collected adjacent the interface is separately removed from the separation zone, the mixture is treated with an alkaline earth metal compound to form alkaline earth metal sulfonate, and organic liquid is separated from said alkaline earth metal sulfonate.

3. Method according to claim 2 wherein said separated organic liquid is recycled to treat additional quantity of water containing sodium alkyl benzene sulfonate detergent.

4. Method according to claim 1 wherein an electrostatic field is applied across said interface to accelerate collection of the sodium alkyl benzene sulfonate.

5. Method according to claim 1 wherein said water-immiscible organic liquid has a mutual solubility with water of less than 0.1%.

6. Method according to claim 1 wherein said water-immiscible organic liquid is kerosine.

7. Method according to claim 1 wherein said sodium alkyl benzene sulfonate detergent has the structure

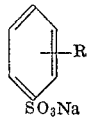

wherein R is a hydrocarbon radical containing 10–22 carbon atoms at least 10 of said carbon atoms being in a straight chain.

8. Method of removing sodium alkyl benzene sulfonate detergent from water which comprises mildly and intimately contacting water containing sodium alkyl benzene sulfonate detergent with a water-immiscible organic liquid, settling the resulting mixture in a separation zone to form an upper organic liquid layer and a lower water layer, whereby sodium alkyl benzene sulfonate detergent collects adjacent the interface between the layers, applying an electrostatic field across the interface between said layers by means of an anode and a cathode to accelerate said collection, and removing from the separation zone water having a reduced content of sodium alkyl benzene sulfonate detergent.

References Cited by the Examiner

UNITED STATES PATENTS

| | | | |
|---|---|---|---|
| 2,264,756 | 12/1941 | Johnston | 210—42 |
| 2,450,585 | 10/1948 | d'Ouville et al. | 260—505 |
| 2,573,675 | 11/1951 | Bloch et al. | 260—505 |
| 2,729,549 | 1/1956 | Reman et al. | 23—267 |
| 2,881,920 | 4/1959 | Simkin | 23—270.5 |
| 2,952,620 | 9/1960 | Wade | 210—54 |

FOREIGN PATENTS 617,250   2/1949   Great Britain.

OTHER REFERENCES

Analytical Chem., vol. 33, Jan.–Apr. 1961, pp. 465–468 relied on. Article "Determination of the Distribution of Nonionic Surface Active Agents Between Water and Iso-Octane."

Schwartz et al., "Surface Active Agents," copyright 1949 by Interscience Publishers, Inc., pp. 111–121 relied upon.

MORRIS O. WOLK, *Primary Examiner.*